(12) United States Patent
Plassmeyer et al.

(10) Patent No.: US 6,447,050 B1
(45) Date of Patent: Sep. 10, 2002

(54) CONVERTIBLE VEHICLE

(75) Inventors: Uwe Plassmeyer, Georgsmarienhuette; Wolf-Dieter Hilgert, Bad Essen, both of (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/614,053

(22) Filed: Jul. 11, 2000

(30) Foreign Application Priority Data

Jul. 17, 1999 (DE) ................................. 299 12 585 U (51) Int. Cl.[7] ............................................... B62D 37/02
(52) U.S. Cl. ................................ 296/180.5; 296/180.1; 296/107
(58) Field of Search ........................ 296/180.5, 180.1, 296/121, 214, 216.03, 107.09, 107.15, 133; 340/472

(56) References Cited

U.S. PATENT DOCUMENTS

| | | | | |
|---|---|---|---|---|
| 2,002,596 A | * | 5/1935 | Westrope | 296/133 |
| 2,556,565 A | * | 6/1951 | Votypka | 296/118 |
| 3,091,494 A | * | 5/1963 | Cohen | 296/137 |
| 3,529,862 A | * | 9/1970 | Jousserandot | 296/1 |
| 4,626,021 A | * | 12/1986 | Muscat | 296/107 |
| 4,828,317 A | * | 5/1989 | Muscat | 296/122 |
| 4,858,635 A | * | 8/1989 | Durm et al. | 296/180.5 |
| 4,887,681 A | * | 12/1989 | Durm et al. | 296/180.5 |
| 4,889,382 A | * | 12/1989 | Burst et al. | 296/180.5 |
| 4,929,013 A | * | 5/1990 | Eke | 296/180.5 |
| 5,074,612 A | * | 12/1991 | Liese et al. | 296/180.5 |
| 5,141,281 A | * | 8/1992 | Eger et al. | 296/180.5 |
| 5,207,474 A | * | 5/1993 | Licher et al. | 296/107 |
| 5,375,901 A | * | 12/1994 | Agosta et al. | 296/146.14 |
| 5,709,426 A | * | 1/1998 | Derees et al. | 296/185 |
| 5,923,245 A | * | 7/1999 | Klatt et al. | 296/180.1 |
| 5,941,595 A | * | 8/1999 | Schroeder et al. | 296/180.1 |
| 6,170,904 B1 | * | 1/2001 | Schaedlich et al. | 296/180.1 |
| 6,312,041 B1 | * | 11/2001 | Queveau et al. | 296/107.17 |

* cited by examiner

*Primary Examiner*—Kiran B. Patel
(74) *Attorney, Agent, or Firm*—Jordan and Hamburg LLP (57) ABSTRACT

A convertible automobile with a roof that is flexible at least in parts, that can be placed into a rear region of the automobile, particularly a convertible automobile with a hatchback rear, is structured in such a way that a spoiler made of a rigid material, integrated into the flexible roof, is assigned to the roof.

17 Claims, 10 Drawing Sheets

CONVERTIBLE VEHICLE

BACKGROUND OF THE INVENTION

The invention relates to a convertible automobile with a roof that is flexible at least in parts.

Such a convertible automobile can have a rigid frame or a rigid plate part, possibly covered by roof material in a front roof region, for example, or can be structured to be completely flexible outside of a roof frame rod construction.

Particularly in the case of convertible automobiles that are not equipped with a stepped rear end and in which the rear roof region makes a slanted downward transition into the rear end region of the automobile body, but also in the case of vehicles with a different design, there is the problem of improving the aerodynamics of the automobile by means of suitable wind-directing measures, for example, by increasing the drive on the rear axle or reducing the eddy stream in the rear end region.

For this purpose, DE 295 09 682 shows a breakaway edge assigned to the automobile body below the roof, which can be used, at the same time, as a holding area for the roof. Such a breakaway edge is not optimal in terms of aerodynamics, because of its deep arrangement and, also, the appearance of the automobile is significantly impaired, and the design effort required for the changes that must be made in the automobile body is great.

SUMMARY OF THE INVENTION

An object of the present invention is to improve the aerodynamics of a convertible automobile of the type stated initially while avoiding the stated disadvantages.

An arrangement in the optimal aerodynamic range is made possible by assigning a spoiler to the flexible roof.

If the spoiler is movable, its function can be adapted to the conditions in each instance, particularly to the speed at which the automobile is being driven. It is advantageous in this connection if the spoiler lies in its rest position in such a way that it lies flush with the outside surface of the roof and therefore does not project out, thereby having a disruptive effect on the appearance. The surface of the spoiler can also be covered with the roof material. As an alternative, for example, a contrasting color or paint is possible, in order to create a particular design feature.

If the spoiler and the drive and holder elements that move it have a modular structure, a complete module can be fitted into the roof in a single assembly step. For this purpose, the latter is framed by the module on the top and the bottom, where riveting, in particular, and possibly also gluing or the like, can be used as measures to connect the rigid parts of the module that carries the spoiler and the flexible roof.

If the module, which carries the spoiler, is connected with a hoop or bow that stretches and supports the roof material, the module on the hoop or bow, which is rigid, is essentially immobilized in the closed state and independent of movements of the roof, on the one hand, and, in addition, because the roof is connected with the module, a stabilizing effect is exerted on the roof at the same time, so that it is prevented from billowing out even at higher speeds. At the same time, the module that carries the spoiler can form part of a roll protection system. Electrical feed lines to the spoiler can be laid in the hoop or bow. If the module, which carries the spoiler, is integrated into the hoop or bow, it forms a bearing element at the same time, so that it performs a dual function as part of the hoop or bow.

Other advantages and characteristics are evident from the exemplary embodiment of the object of the invention shown in the accompanying drawings.

DESCRIPTION OF THE PREFERRED EMBODIMENTS

According to the exemplary embodiment in the drawing, the inventive convertible automobile 1 has a folding roof 2, which ends in a hatchback region 3. The roof 2 is structured to be flexible, at least in region 4, and has a module 11 that carries a spoiler 5.

The roof 2, as a whole, together with the module 11 and the spoiler 5, can be laid into rear-end region 3 of the automobile 1.

Figure 1:
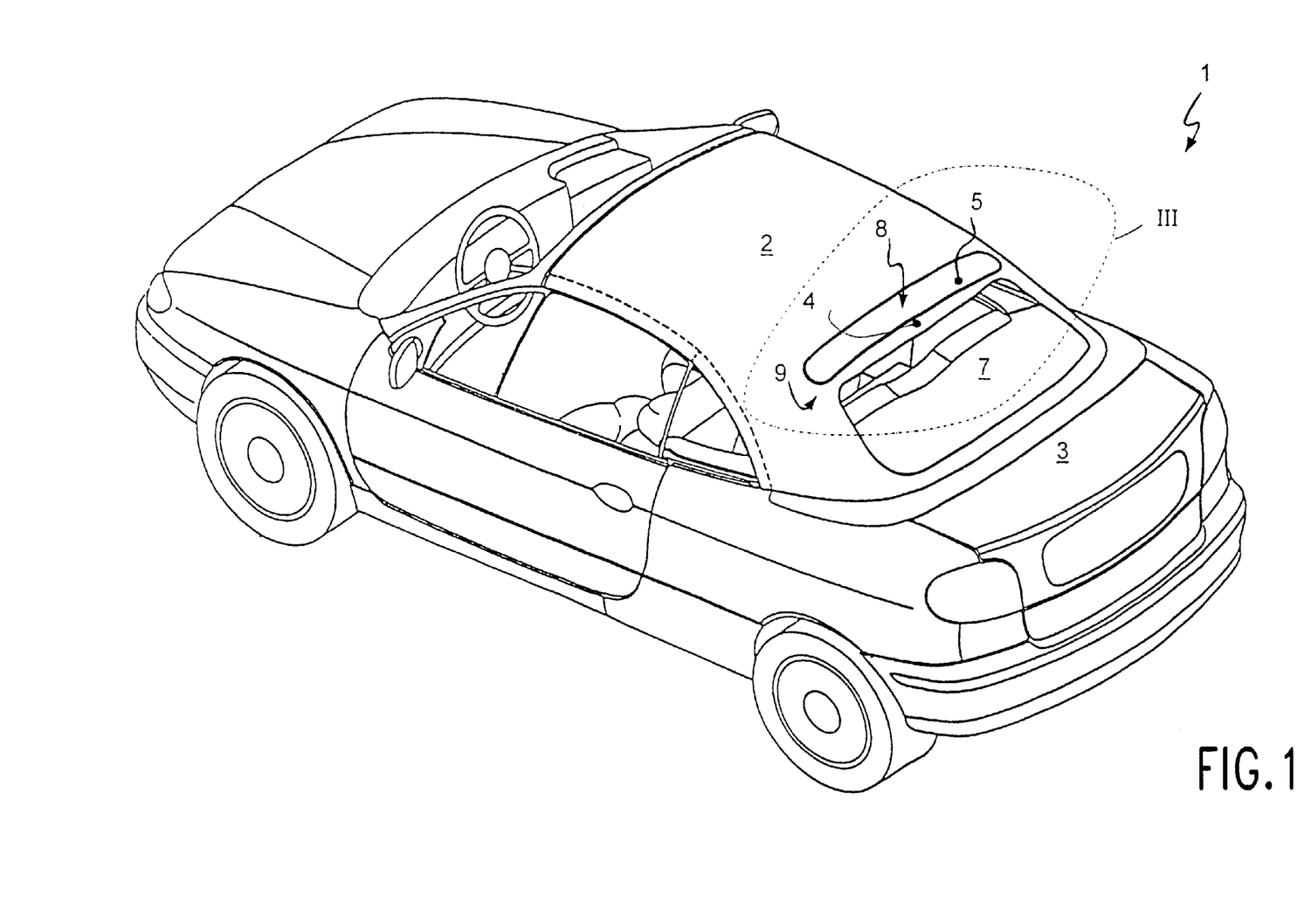
FIG. 1 shows a perspective overall view of a convertible automobile according to the invention, seen at a slant from the rear, with the spoiler in the rest position.
Figure 2:
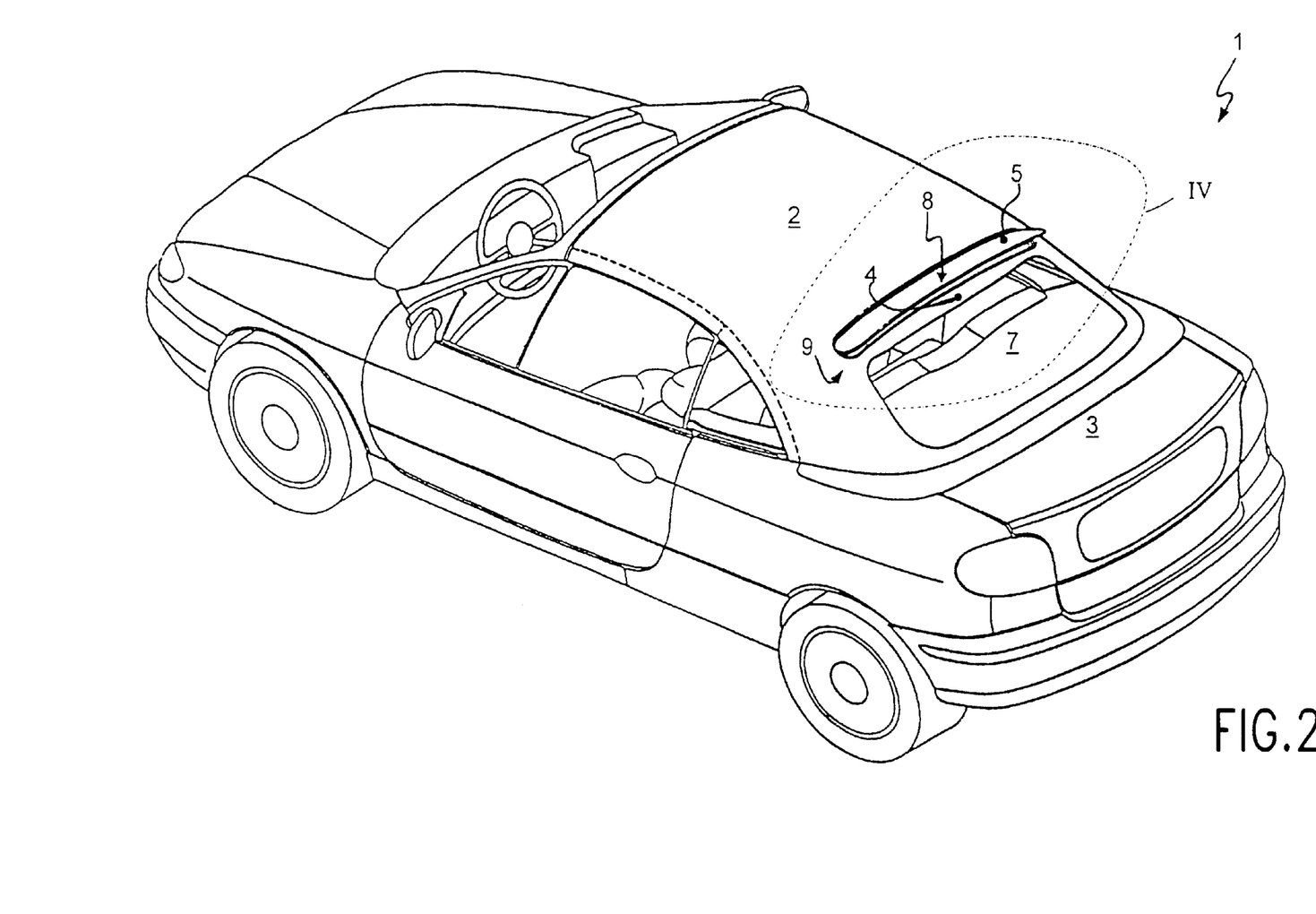
FIG. 2 shows a similar view as in FIG. 1, with the spoiler in the active position.
Figure 3:
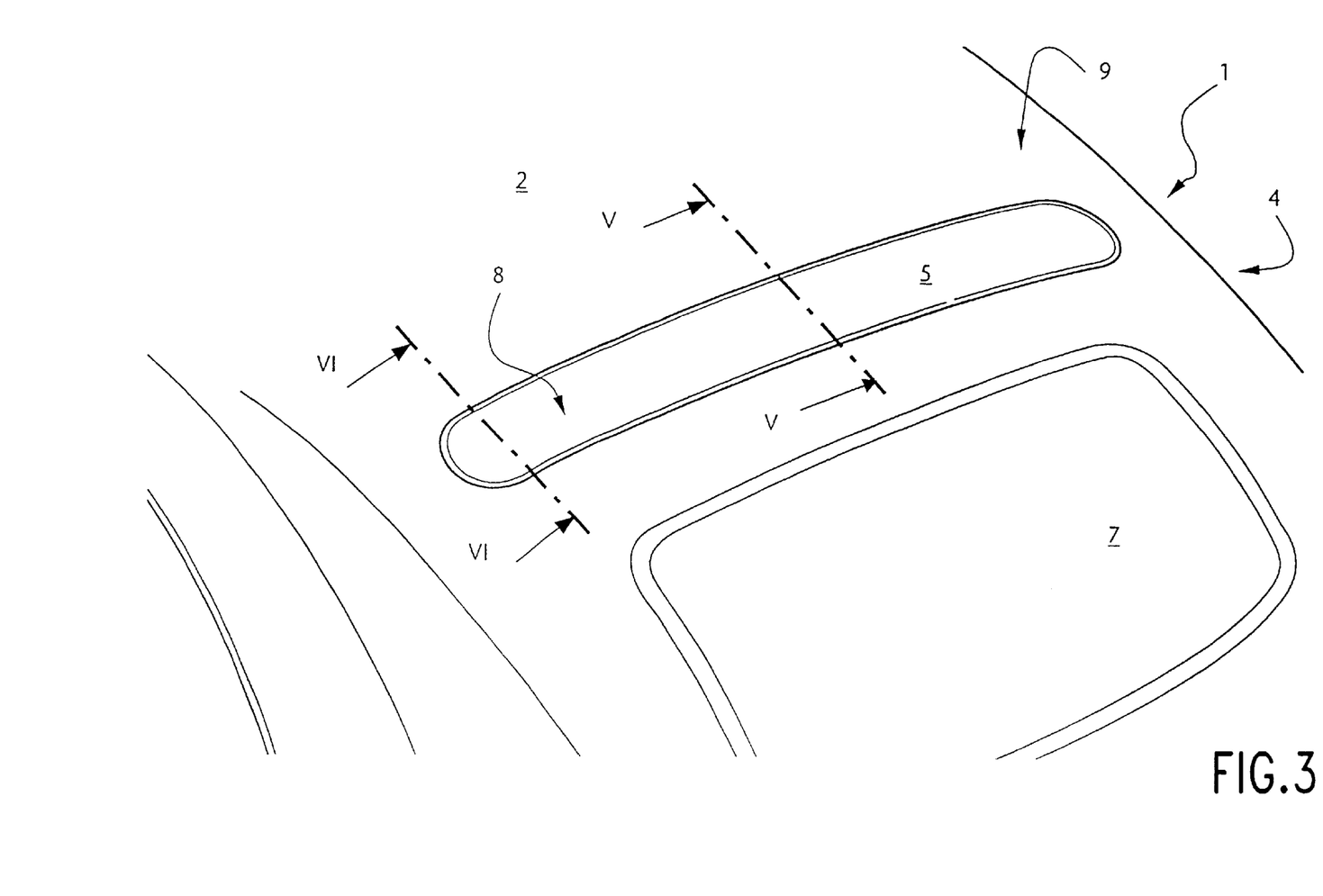
FIG. 3 shows detail III of FIG. 1.
Figure 4:
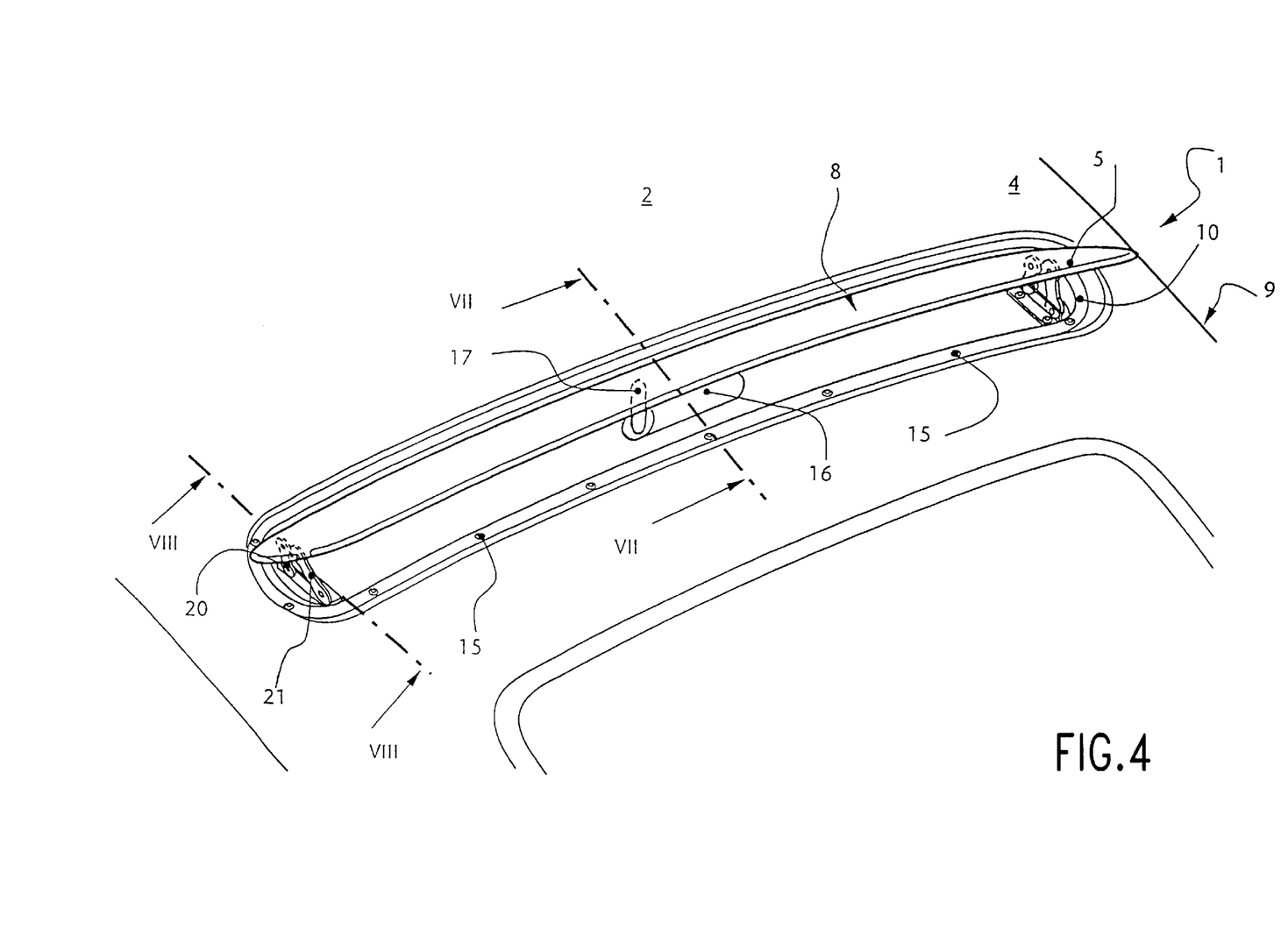
FIG. 4 shows detail IV of FIG. 2.
Figure 5:
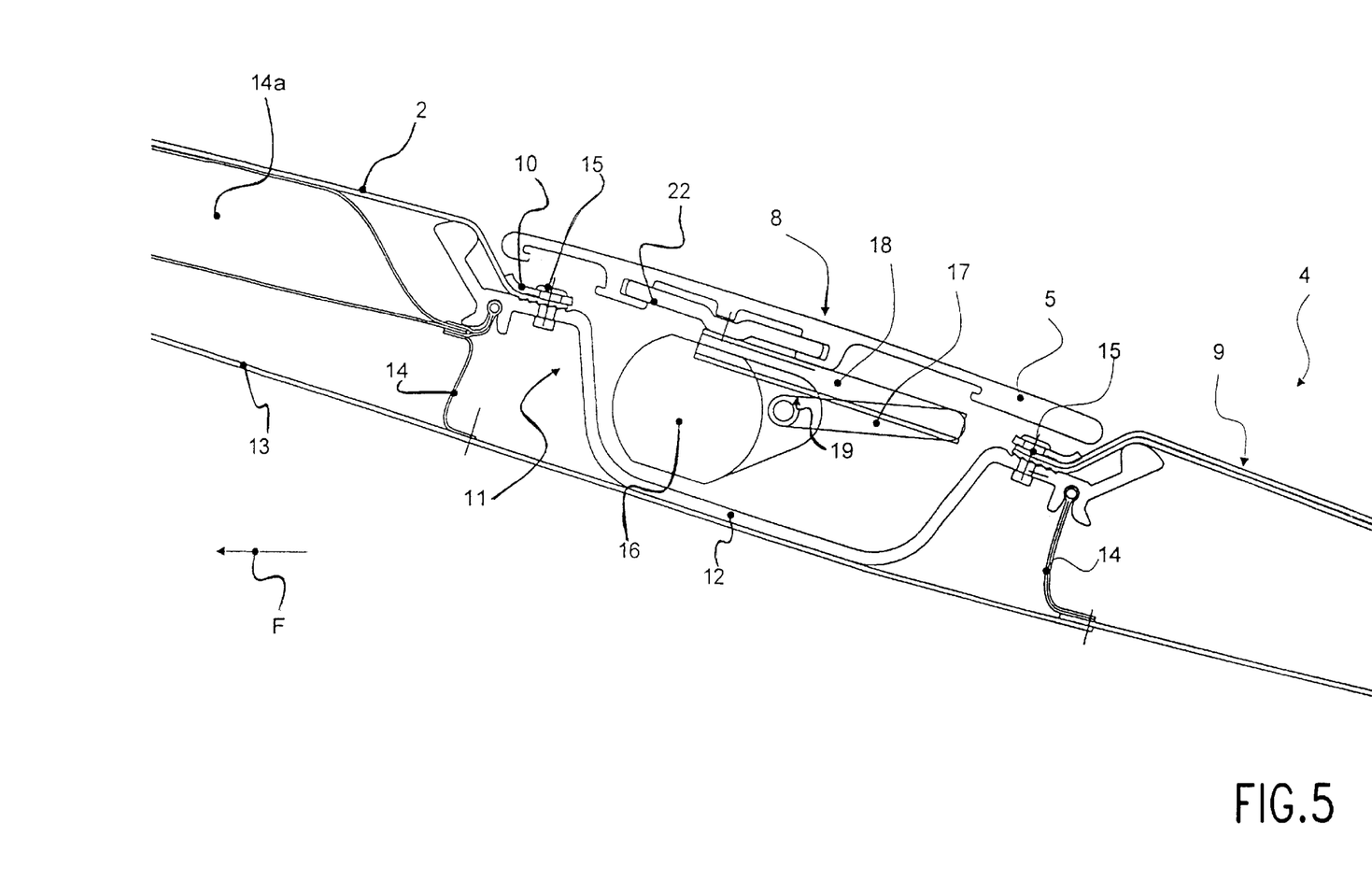
FIG. 5 shows a section along Line V—V in FIG. 3.

The spoiler 5 is arranged above a rear windshield 7, and its outer surface 8 ends flush with the outer surface 9 of the roof 2 in its rest position (FIG. 5). In the active position (FIG. 7), the spoiler projects away from the roof 2, so that it forms a breakaway edge and increases the negative lift of the rear end 3 of the automobile.

The setting of the active position can be made both as a function of the speed and by manual activation of a corresponding mechanism by the driver. In addition, a safety device can be provided to ensure that the roof 2 can be opened only when the spoiler 5 is in the rest position.

In total, the spoiler 5 is contained in a module 11, which includes a circumferential frame 10 on the top and a trough-shaped holding unit 12 for drive and holder elements of the spoiler 5 on the bottom. The entire module 11 is covered, in the interior, by the roof lining 13 and, in the interstice between the outer roof covering and the roof lining, there is a single-layer or multi-layer roof padding 14a, depending on the embodiment. A connection with the roof lining 13 is assured by means of connection tabs 14 that are glued or bonded on, or the like. To connect the module 11 with the roof 2, the frame 10, which lies below the spoiler 5 and essentially follows the outline of the spoiler 5 in its shape, is connected with the roof material by means of rivets 15. In this connection, the roof material is held between this frame and the top edge of the holding unit 12, where the rivets pass through the frame 10, the roof material 2, as well as the edge of the holding unit 12. Therefore, the roof material is held in place between the frame 10, which forms a cover strip at the same time, and the edge region of the trough-shaped holding unit 12.

In order to allow the angle of the spoiler 5 to be changed, at least one motor drive 16, in this case an electric motor, is arranged in the holding unit 12. In the exemplary embodiment, this motor is located in the center region and is provided with a drive lever 17, which can be made to pivot by the motor 16. At its end region facing away from the motor 16, the drive lever 17 is held in a linear guide 18, which extends parallel to the crosswise expanse of the spoiler 5. By pivoting along the arrow 19 (transition from FIG. 5 to FIG. 7), the end of the drive lever 17, which is located to the side of the drive 16, is moved forward in the direction of travel F, in the linear guide 18, causing the raised position of the spoiler 5, which is additionally connected with the holding unit 12 via other levers 20, 21, to be brought about. In place of an electric motor, a hydraulic cylinder is also possible as the drive 16. Instead of the side levers 20, 21 explained below, a hinge at the front edge of the spoiler can also be provided for a pure pivoting motion.

The levers 20, 21 are located in the laterally outside region of the spoiler 5 and are arranged symmetrical to a vertical longitudinal center plane of the automobile 1, on both sides. The levers 20, 21 are connected with the spoiler carrier 22, relative to which the spoiler 5 can be pushed up, for example, and can also be replaced easily.

Figure 6:
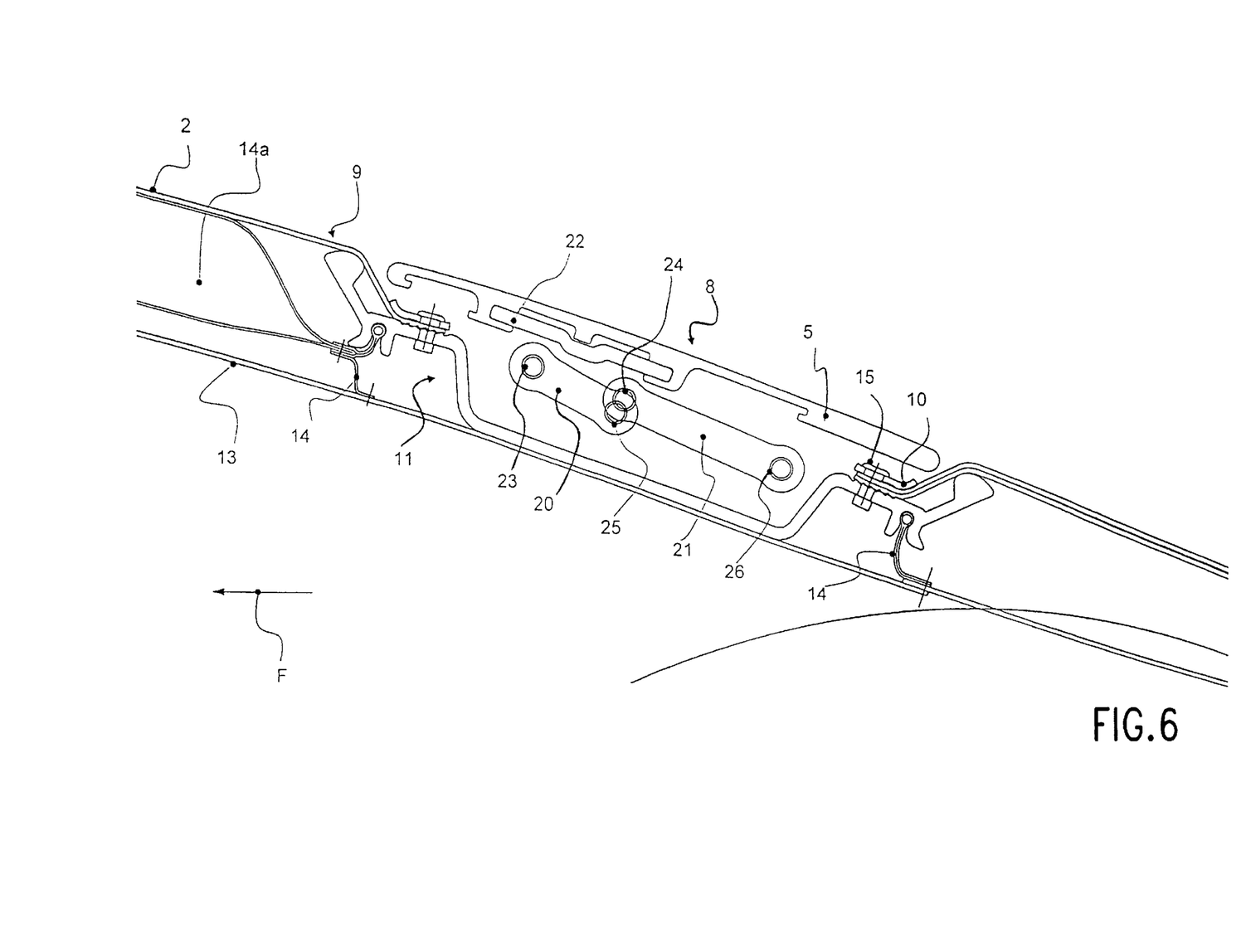
FIG. 6 shows a section along Line VI—VI in FIG. 3.
Figure 8:
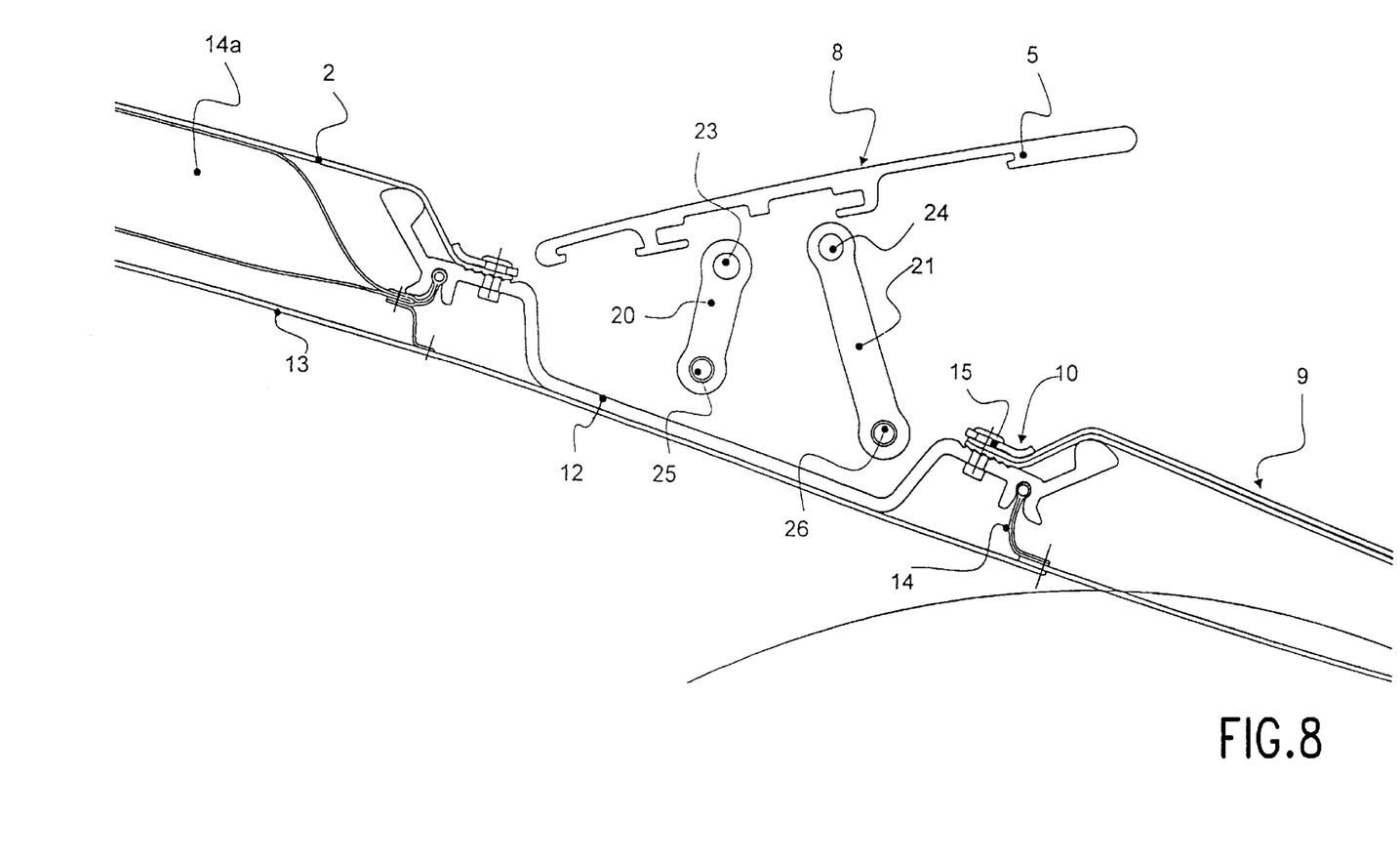
FIG. 8 shows a section along Line VIII—VIII in FIG. 4.

To connect the levers 20, 21, two rotating joints 23, 24 are provided at their top end region and, in their end region facing the holding unit 12, they are provided with two other rotating joints 25, 26, with which they are connected with this holding unit 12. In total, a four-part joint is formed in this way. In the rest position of the spoiler (FIG. 6), the levers 20, 21 are positioned in the holding unit 12 almost parallel to the progression of the roof. By activating the drive lever 17 and moving it in the linear guide 18, the levers 20, 21 are put into an upright position (FIG. 8). Because the lever 20, which is in the front in the direction of travel F, is shorter, the spoiler 5 is set at a slant. Because of the lever mechanism, this is not purely a pivoting movement, rather a slight displacement counter to the direction of travel F takes place at the same time, therefore raising and lowering the spoiler is a combined rotation and translation movement.

The spoiler 5 can be made of a suitable plastic or also of sheet aluminum or sheet steel, and its outside surface can have various forms. The holding unit 12, as a whole, as well as the frame 10, are each a stable, rigid component, which stretch the roof 2 in the connection region, in interaction with each other, and should be made of a correspondingly stable material. The module 11, which carries the spoiler, can be integrated into a hoop or bow and therefore form a bearing part for the roof 2. In that case, the weight additionally to be introduced into the automobile by the module is reduced, because part of the hoop or bow can be recessed for it.

Figure 7:
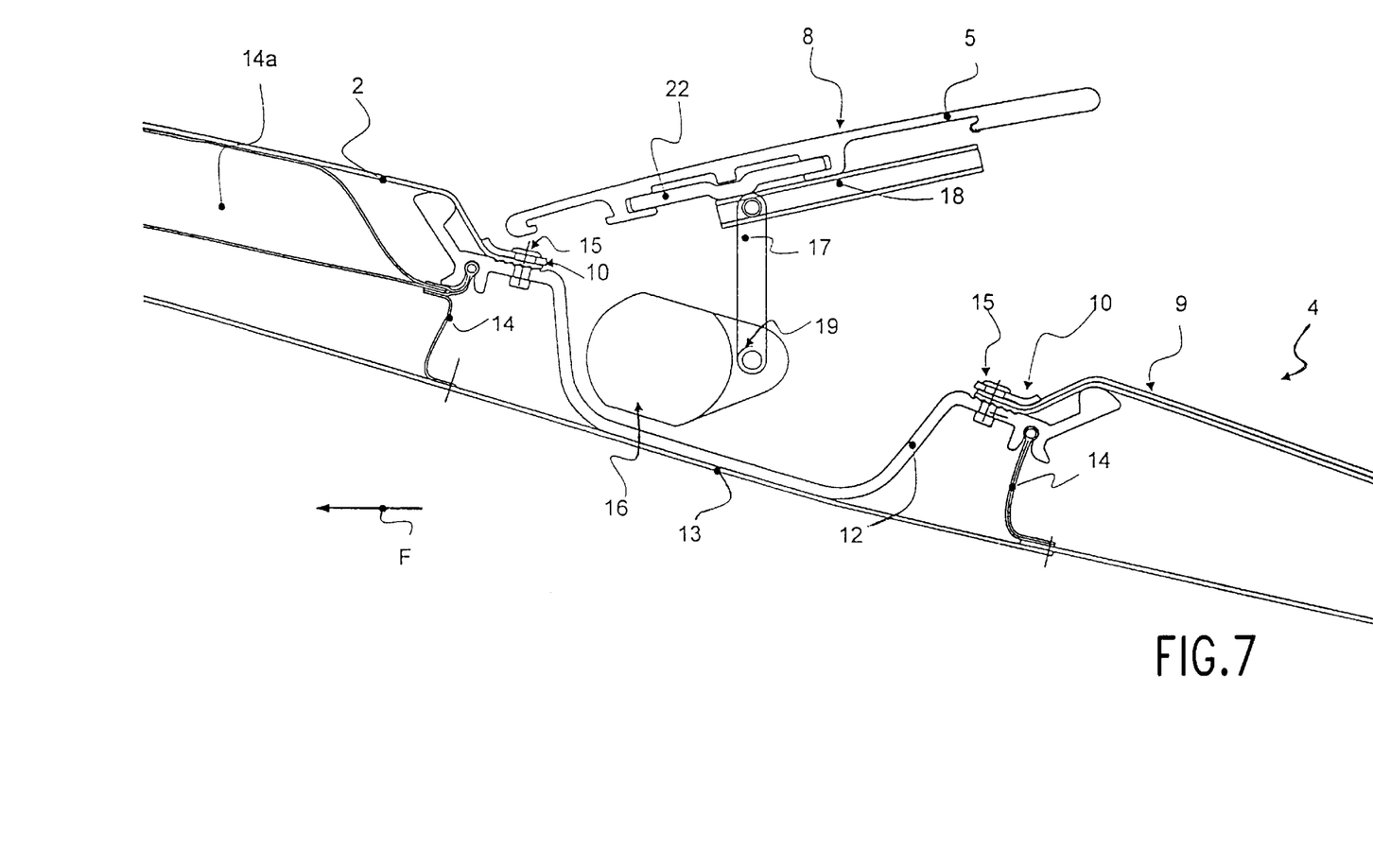
FIG. 7 shows a section along Line VII—VII in FIG. 4.
Figure 9:
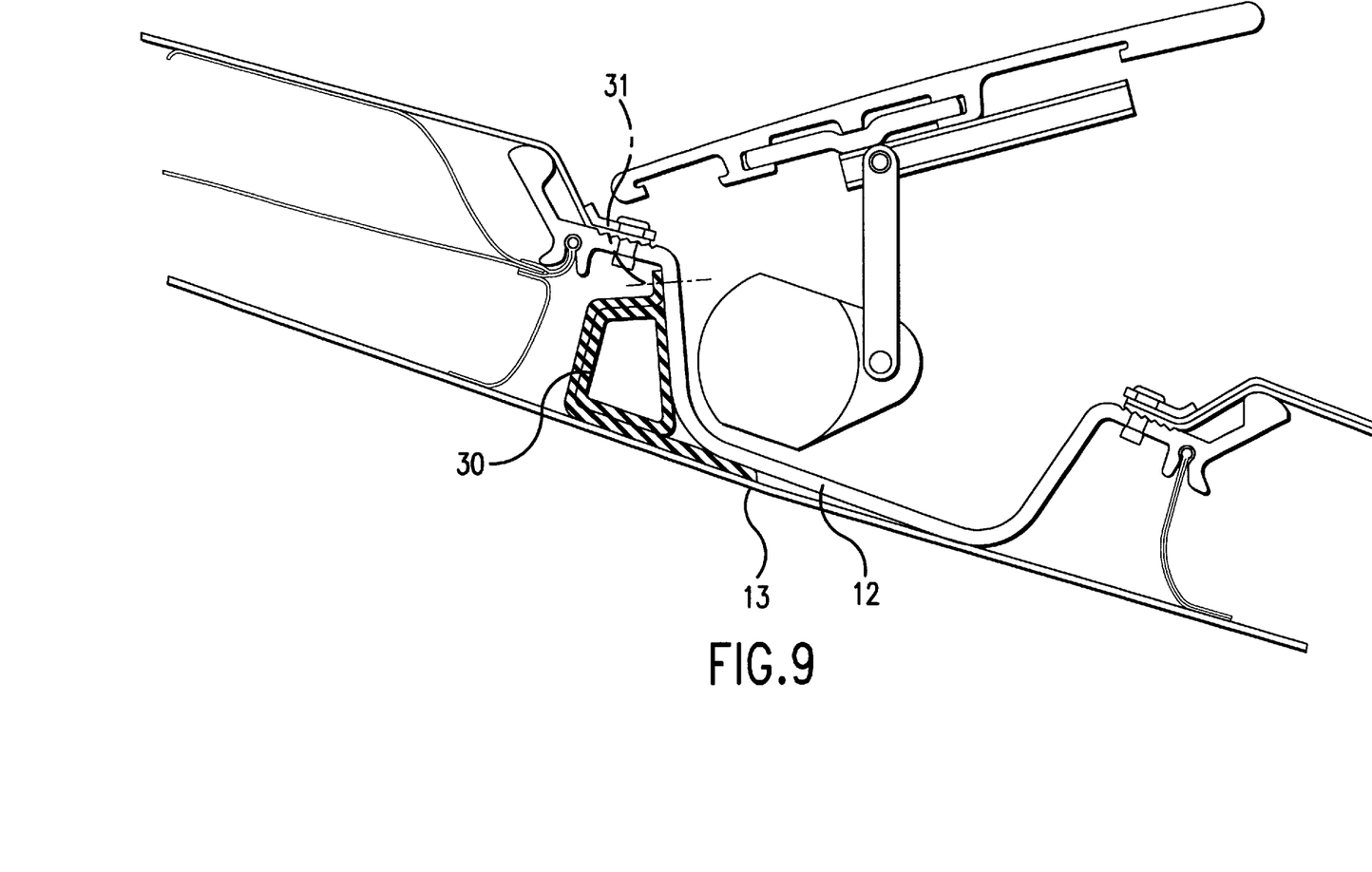
FIG. 9 is a view similar to FIG. 7 but showing an alternate embodiment which includes a connection between the spoiler unit and a bow or hoop of the convertible roof.

FIG. 9 is an alternate embodiment similar to FIG. 7, but showing a bow or hoop element 30 in cross section. The element 30 is disposed juxtaposed to a part of the holding unit 12 and secured to the holding unit 12 by fasteners 31.

Figure 10:
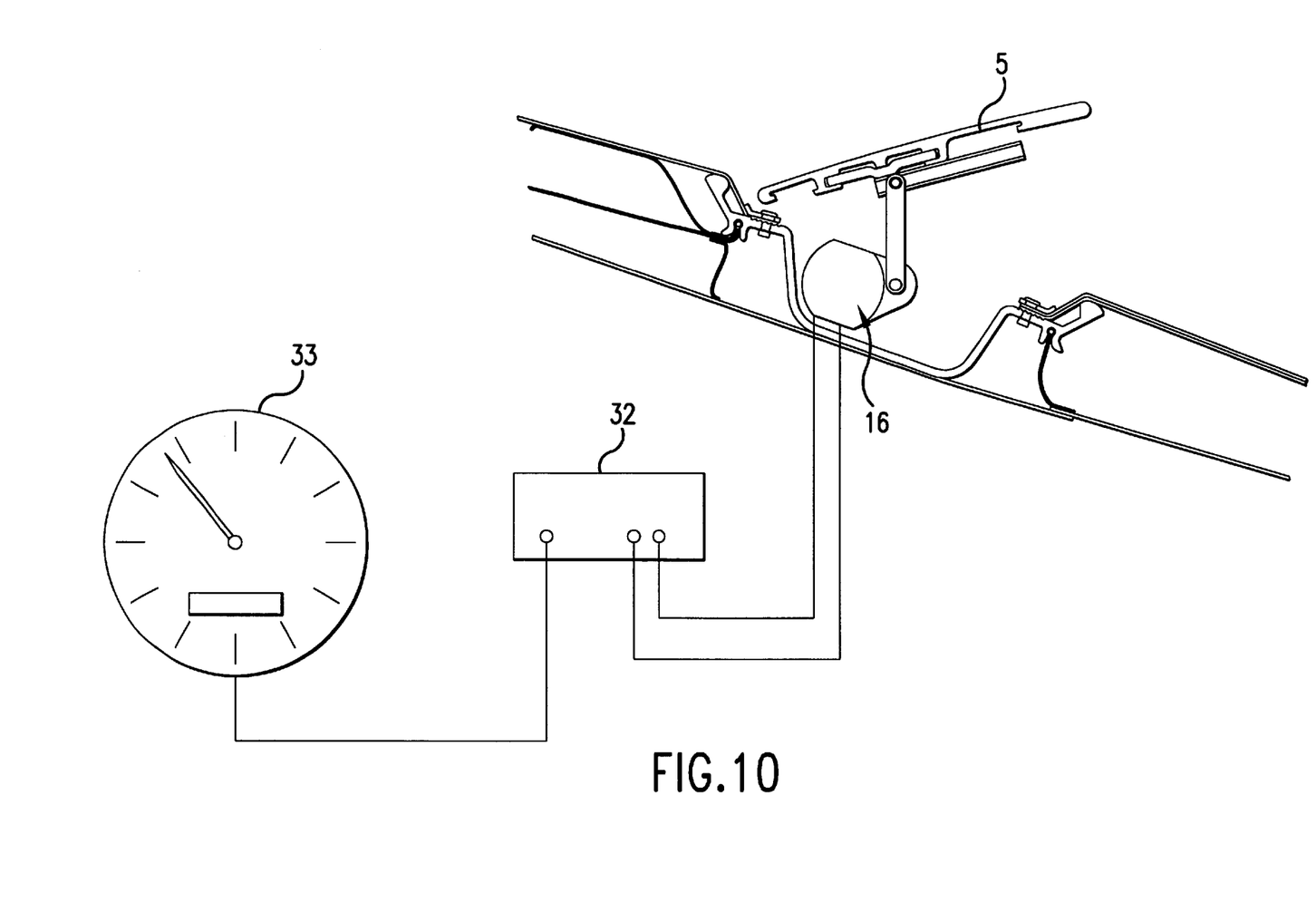
FIG. 10 shows an arrangement for utilizing the spoiler depending on the speed of the automobile.

FIG. 10 is a view similar to FIG. 7 but on a smaller scale but also showing a controller 32 receiving an input from a speedometer 33 which indicates the speed of the automobile and which is connected to the motor 16 to thereby control the movement of the spoiler 5 depending on the speed of the automobile.

What we claim is:

1. A convertible roof for an automobile body comprising:
   a convertible roof structure having a flexible roof part, said convertible roof structure being movable between a closed position and an open position relative to said automobile body; and
   a spoiler unit disposed on said flexible roof part, said spoiler unit being movable along with said convertible roof structure relative to said automobile body when said convertible roof structure is moved between said closed and open positions, said spoiler unit including a drive portion and a spoiler element, said drive portion moving said spoiler element relative to the roof structure and relative to said automobile body when the roof structure is in said closed position.

2. A convertible roof according to claim 1 wherein said spoiler is moved relative to the roof structure depending on the speed of the automobile body.

3. A convertible roof according to claim 1 wherein said convertible roof sure includes a rear window, said spoiler unit being disposed at a higher elevation then said rear window where said roof structure is in said closed position.

4. A convertible roof according to claim 1 wherein said spoiler in formed as a modular unit which is mounted on said roof structure.

5. A convertible roof according to claim 4 wherein the convertible roof structure comprises a bowed support member which supports said flexible roof part, said modular unit being mounted on said bowed support member.

6. A convertible roof according to claim 4 wherein said modular unit comprises a circumferential frame connected to said flexible roof part.

7. A convertible roof according to claim 4 wherein said convertible roof structure includes an interior lining which covers said modular unit.

8. A convertible roof for an automobile body comprising:
   a roof structure having a flexible roof part, said roof structure being movable between an open position and a closed position relative to said automobile body; and
   a spoiler device mounted on said flexible roof part, said spoiler device including a spoiler element and a spoiler support structure supporting said spoiler element, said spoiler Support structure being operable to move said spoiler element relative to said spoiler support structure and relative to said automobile body when said roof structure is in said closed position.

9. A convertible roof according to claim 8 wherein said spoiler support structure comprises a trough-shaped holding unit generally underlying the spoiler element, and a power device in said trough-shaped holding unit for effecting movement of the spoiler element relative to the spoiler support structure.

10. A convertible roof for an automobile comprising:
    a roof structure having a flexible roof part comprised of flexible material;
    a spoiler device including a spoiler element and a spoiler support structure supporting said spoiler element, said spoiler structure being mounted on said roof structure said spoiler support structure comprises a trough-shaped holding unit generally underlying the spoiler element, said spoiler support structure including a circumferential frame, said flexible material being held between said frame and said trough-shaped holding unit; and
    a power device provided in said trough-shaped holding unit for effecting movement of the spoiler element relative to the spoiler structure.

11. A convertible roof according to claim 9 wherein said power device comprises an electric motor mounted in said trough-shaped holding unit.

12. A convertible roof according to claim 11 wherein:
    said power device comprises an actuating lever actuated by said motor;
    said spoiler element includes a slide part; and
    said actuating lever includes a lever part slidable in said slide part such that rotation of said motor pivots said actuating lever so that said lever part slides in said slide part to effect movement of said spoiler element relative to said spoiler support structure.

13. A convertible roof according to claim 12 comprising a joint arrangement between said spoiler element on said spoiler support structure, said joint arrangement comprising two joint members, each of said two joint member being pivotably connected to said spoiler element and to said spoiler support structure.

14. A convertible roof according to claim 13 wherein said joint structure along with said power device are operable to impart a pivoting and a translatory movement to the spoiler element relative to the spoiler support structure.

15. A convertible roof according to claim 8 comprising an operating device connected between said spoiler element and said spoiler support structure for effecting a pivoting and translatory movement of the spoiler element relative to the spoiler support structure.

16. A convertible roof according to claim 8 comprising a power device on said spoiler support structure, said power device being connected to said spoiler element and being operable to move said spoiler element between a deployed position and a retracted position, said spoiler element when in said retracted position being substantially flush with said roof structure, said spoiler element when in said deployed position being disposed at an angle greater than zero degrees relative to said roof structure.

17. A convertible roof for an automobile body comprising:

a roof structure having a flexible roof part, said roof structure being movable between a first position in which said roof structure at least partially covers an overhead of the automobile body and a second position in which the overhead is at least partially open; and a spoiler device including a spoiler structure supporting a spoiler element, said spoiler structure being mounted on said roof structure at said flexible roof part such that said spoiler device moves with said flexible roof part when said roof structure is moved between said first and second positions, said spoiler device further including a power driven device for effecting movement of said spoiler element relative to said spoiler structure and relative to said automobile body when said roof structure is in said first position.

\* \* \* \* \*

UNITED STATES PATENT AND TRADEMARK OFFICE
CERTIFICATE OF CORRECTION

PATENT NO. : 6,447,050 B1
DATED : September 10, 2002
INVENTOR(S) : Uwe Plassmeyer et al.

It is certified that error appears in the above-identified patent and that said Letters Patent is hereby corrected as shown below:

<u>Title page,</u>
Item [30], please correct the Foreign Application Priority Data from:
"July 17, 1999    (DE) ............... 299 12 585.4" to
-- July 17, 1999    (DE) ............... 299 12 525.4 --

Signed and Sealed this

Fourteenth Day of January, 2003

JAMES E. ROGAN
*Director of the United States Patent and Trademark Office*